(No Model.)

A. E. GRODEM & T. CHRISTENSEN.
SAW SET.

No. 562,525. Patented June 23, 1896.

Witnesses.
C. F. Kilgore
E. F. Elmore

Inventors.
Andrew E. Grodem.
Thomas Christensen.
By their Attorney,
Jas. F. Williamson

UNITED STATES PATENT OFFICE.

ANDREW E. GRODEM AND THOMAS CHRISTENSEN, OF MINNEAPOLIS, MINNESOTA.

SAW-SET.

SPECIFICATION forming part of Letters Patent No. 562,525, dated June 23, 1896.

Application filed February 14, 1896. Serial No. 579,262. (No model.)

*To all whom it may concern:*

Be it known that we, ANDREW E. GRODEM and THOMAS CHRISTENSEN, citizens of the United States, residing at Minneapolis, in the county of Hennepin and State of Minnesota, have invented certain new and useful Improvements in Saw-Sets; and we do hereby declare the following to be a full, clear, and exact description of the invention, such as will enable others skilled in the art to which it appertains to make and use the same.

Our invention has for its object to provide an improved saw-set.

To this end our invention comprises the novel devices and combinations of devices hereinafter described, and defined in the claims.

As preferably constructed the tool is in the form of a pair of plier or nipper like hand-pieces, adapted to carry and operate the setting-jaws. The setting-jaws are also preferably arranged for lateral adjustment, one with respect to the other, and the reciprocating or biting movement of said jaws may also be regulated by a variable stop device. The former feature permits the lateral adjustment of the setting-jaws so as to adapt the tool to the pitch or spacing of the particular saw to which it is to be applied while the latter adjustment regulates the amount of set or lateral bend which is to be given to the teeth.

When this tool is applied to the teeth of a saw, two adjacent teeth of the same may be set at one time; that is, under one biting action of the tool, one tooth will be bent laterally in one direction, and the adjacent tooth in the reverse direction. By continuing this operation, as is obvious, the saw may be set, two teeth at a time, by simply passing the tool over the saw once, and without changing the position of the same from one side of the saw to the other.

The preferred form of our invention is illustrated in the accompanying drawings, wherein, like letters referring to like parts throughout the several views—

Figure 1:
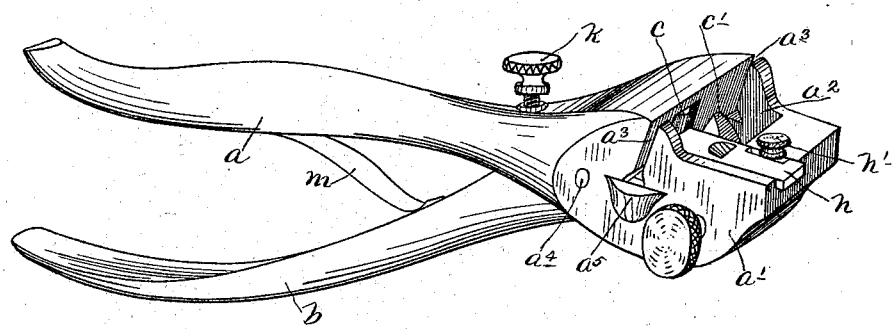
Figure 2:
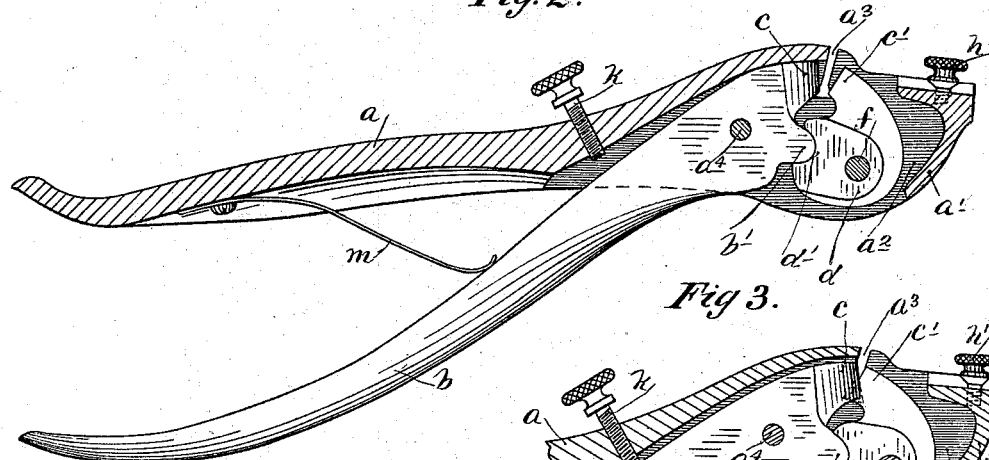
Figure 3:
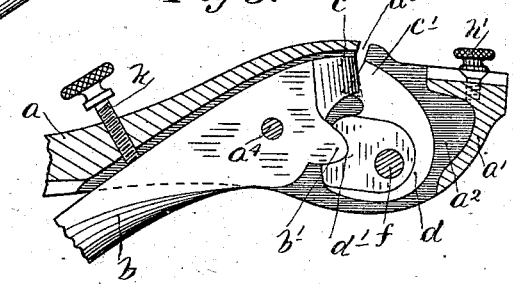
Figure 4:
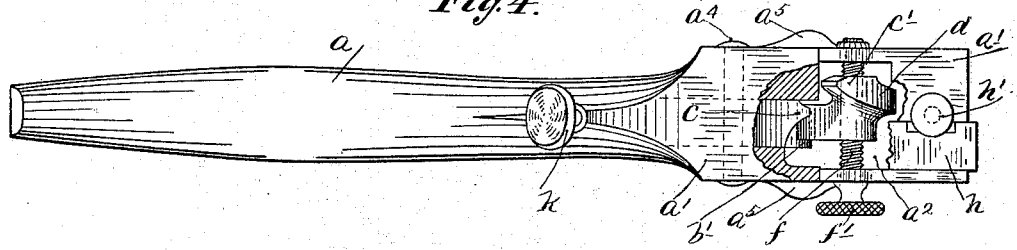

Figure 1 is a perspective view of our improved saw-set. Fig. 2 is a view, partly in central longitudinal section and partly in side elevation, showing the parts in their normal position. Fig. 3 is a view corresponding to Fig. 2, except that some parts are broken away and that the setting-jaws are shown in their closed or operative positions; and Fig. 4 is a plan view of the saw-set, some parts of the same being broken away.

$a$ and $b$ indicate a pair of nipper-like hand-levers. Of these hand-levers the member $a$ is provided with an enlarged head $a'$, which is recessed at $a^2$ and provided with a transverse slot $a^3$, which cuts the recess $a^2$ substantially at a right angle thereto. The hand-lever $b$ works in the recess $a^2$, is pivoted to the head $a'$ of said lever $a$ by means of a pin $a^4$, and terminates at its inner end in a setting jaw or die $c$ and tooth $b'$.

$c'$ indicates the laterally-adjustable member of the setting jaws or dies which, as shown, is formed by an eccentric projection of a tumbler $d$. This tumbler $d$ is pivotally mounted in the recess $a^2$ of the head $a'$ by means of a screw-threaded pivot-rod $f$, which is mounted transversely, with freedom for rotary but fixed against endwise movement in the side walls of the head $a'$. The tumbler $d$ is provided with a notch $d'$ into which the tooth $b'$ of the lever $b$ works. The screw-threaded pivot-rod $f$ is preferably provided on one of its projecting ends with a knurled head $f'$, by means of which it may be readily turned. As is evident, by turning the screw-threaded pivot-rod $f$ the tumbler $d$ and setting-jaw $c'$ may be laterally adjusted.

It may be here noted that, in the normal position of the parts, the transverse slot $a^3$, in the head $a'$, furnishes a transverse opening between the biting-points of the setting-jaws $c$ and $c'$. Hence, the saw may be inserted through the slot $a^3$ to bring its teeth in position to be operated upon by said setting-jaws. As shown, the head-piece $a'$ is provided with laterally-projecting shelves or brackets $a^5$, which serve as straight-edge extensions to the bottom of the groove or slot $a^3$, and serve to hold the points of the saw-teeth in proper position, or at a proper depth. Preferably the slot $a^3$ is made of sufficient width to permit the insertion of a saw of a maximum gage or thickness, and we provide an adjustable slide $h$, which works in a suitable seat in the head $a'$, and is held in any adjusted position by means of a friction-screw $h'$, seated in said head $a'$ and impinging on said slide $h$. This slide $h$ may, as is evident, be adjusted so as to adapt the tool to any gage or thickness of a saw which is to be set. $k$ indicates a screw with a knurled head, the stem of which works through the hand-lever $a$ and serves to variably intercept the closing movement of the lever $b$ with respect to said lever $a$. By this means, as already indicated, the amount of pivotal movement or setting bite which the setting-jaws are given may be varied, at will, so as to give the desired amount of set to the saw-teeth. $m$ indicates a leaf-spring, which, as shown, is secured at one end to the inner side of the lever $a$ and bears with its free end against the inside of the lever $b$, thus tending to hold said levers apart and the jaws $c\ c'$ in their open position. As is obvious, the setting-jaws $c$ and $c'$ are closed onto the saw-teeth, in the setting action, by the gripping action of the operator's hand forcing said levers $a$ and $b$ together.

It must be evident, from the foregoing, that our improved saw-set, while extremely simple in construction, is a much more efficient device than the old forms of single-jaw type of saw-sets. In fact, the same amount of work can be accomplished, by the use of our improved saw-set, in half the time and by exactly half the number of operations of the tool that would be required by the use of one of the old forms of saw-sets.

It will be understood, of course, that various alterations in the details of construction may be made without departing from the spirit of our invention.

What we claim, and desire to secure by Letters Patent of the United States, is as follows:

1. A saw-set comprising a pair of pivotally-connected levers, one of which is provided with a head-piece and the other of which terminates in a setting-jaw, and a tumbler pivotally mounted on said head-piece, provided with a setting-jaw and connected to said jaw-carrying lever for reverse pivotal oscillations with respect thereto, substantially as described.

2. A saw-set comprising a pair of pivotally-connected hand-levers, one of which is provided with a recessed head and the other of which terminates within said recessed head, in a setting-jaw, and a tumbler pivotally mounted in said recessed head, provided with a projecting setting-jaw and having a tooth-and-notch engagement with said tooth-carrying lever, substantially as described.

3. A saw-set comprising a pair of pivotally-connected hand-levers, one of which is provided with a recessed head and the other of which terminates within said recessed head, in a setting-jaw, and a tumbler mounted within said recessed head for pivotal movement and lateral adjustment on the pivot-shaft supported transversely in the walls of said head, said tumbler being provided with a projecting setting-jaw and having a tooth-notch engagement with said tooth-carrying lever, substantially as described.

In testimony whereof we affix our signatures in presence of two witnesses.

ANDREW E. GRODEM.
THOMAS CHRISTENSEN.

Witnesses:
E. F. ELMORE,
WM. R. MORRIS.